US007690513B1

(12) United States Patent
Gustin

(10) Patent No.: US 7,690,513 B1

(45) Date of Patent: Apr. 6, 2010

(54) GRAVEL LOG WASHER WITH GROUPS OF OFFSET PADDLES WHEREIN PADDLES WITHIN EACH GROUP ARE FURTHER OFFSET

(75) Inventor: Larry S. Gustin, Fontana, CA (US)

(73) Assignee: Gator Machinery, Inc., Fontana, CA (US)

( * ) Notice: Subject to any disclaimer, the term of this patent is extended or adjusted under 35 U.S.C. 154(b) by 3 days.

(21) Appl. No.: 12/177,855

(22) Filed: Jul. 22, 2008

Related U.S. Application Data

(60) Provisional application No. 60/991,652, filed on Nov. 30, 2007.

(51) Int. Cl.
*B23Q 3/00* (2006.01)

(52) U.S. Cl. ....................... 209/464; 209/132; 209/465; 405/128.45

(58) Field of Classification Search ................. 209/460, 209/463, 464, 440, 452, 458
See application file for complete search history.

(56) References Cited

U.S. PATENT DOCUMENTS

| | | | | |
|---|---|---|---|---|
| 5,013,185 | A * | 5/1991 | Taki | 405/128.45 |
| 6,752,274 | B2 * | 6/2004 | Mirras | 209/464 |
| 2003/0155278 | A1 * | 8/2003 | Mirras | 209/132 |

* cited by examiner

*Primary Examiner*—Patrick H Mackey
*Assistant Examiner*—Terrell H Matthews
(74) *Attorney, Agent, or Firm*—Knobbe, Martens, Olson & Bear, LLP

(57) ABSTRACT

A log washer apparatus having two longitudinal shafts. The shaft includes paddles arranged into groups. Some of the groups are aligned about the circumference of the shaft such that each of the paddles in the group extend outward from the shaft at the same circumferential location about the shaft. Some of the groups are offset such that paddles within the offset groups are offset with respect to the adjacent paddles so as to increase fluid flow in the log washer.

19 Claims, 6 Drawing Sheets

GRAVEL LOG WASHER WITH GROUPS OF OFFSET PADDLES WHEREIN PADDLES WITHIN EACH GROUP ARE FURTHER OFFSET

CROSS-REFERENCE TO RELATED APPLICATIONS

This application claims the benefit of U.S. Provisional Application No. 60/991,652, filed Nov. 30, 2007, which is hereby incorporated in its entirety by reference herein.

BACKGROUND OF THE INVENTION

1. Field of the Invention

The present invention relates to systems and methods for the separation and washing of clay, dirt, and other impurities from gravel, and particularly to a log washer which has a sectioned shaft with groups of offset paddles, wherein paddles within each group are further offset from each other.

2. Description of the Related Art

With the increase in the number of large scale construction projects, as well as landscaping projects that are currently in development, there has been a corresponding increase in the demand for gravel. Gravel is a widely used material in the modern construction industry. As a component for concrete, roadways, and other materials, gravel is needed for the expansion of future constructive endeavors. Gravel is often obtained conventionally by using strip mining techniques in quarries. In this operation, large amounts of earth and rock from the barren Earth are removed in the long strips. The resulting gravel from this material, however, often has much unwanted debris, such as sticks, roots, and clay. In order to prepare gravel for the commercial market, it is necessary to wash and remove these contaminant materials from the gravel.

Log washers derive their name from the early practice of putting short lengths of wood logs inside a rotating drum with sand and gravel to aide in the scrubbing motion of various aggregate materials. Despite the name's suggestive nature, log washers do not wash timber. Instead, today's log washers are a commonly used mechanical device in the quarry industry, being used to break down and separate clay, dirt, agglomerated rock, organic waste material, and other impurities from aggregates such as gravel and sand.

Typical log washers have a tank or trough mounted on an incline relative to the horizontal at an angle of between about five to ten degrees, with eight degrees being typical. A pair of parallel shafts, horizontally spaced from each other, run along the lengthwise direction of the tank rotate freely. A motor is connected to one end of the shafts by an appropriate gearing to rotate each of the shafts in opposite directions. Each shaft has a plurality of paddles mounted thereon, usually mounted to the shaft at an angle. The paddles on adjacent shafts are staggered such that the intermeshing nature of the counter-rotating shafts subject the aggregate material to a persistent abrading and grinding action which separates the gravel from the undesired material. Feed material is fed to the lower end of the log washer by the use of an appropriate hopper or conveyor belt, while the paddles then mesh the aggregate material and slowly move the gravel towards the upper end of the tank. The clean gravel is then discharged out of the bottom of the upper end of the tank while the undesired material are absorbed by the water and carrier over a weir over either side of the box.

A problem with conventional log washers, however, is the placement of the paddles along the shaft. For example, the paddles are often mounted in straight rows along the length of the shaft. Upon each complete rotation of the shafts, and therefore the paddles, the entire load in the tank is tossed laterally against the entire sidewalls of the tank. This lateral shifting of the tank creates significant vibrations which reverberate along the entire length of the tank. These reverberations cause the shafts and tank's support structures to experience much stress and strain due to the persistent rocking back and forth motion caused by the counter-rotating shafts.

The greater the forces involved, the studier the shaft and shaft tank support structure must be to withstand the persistent reverberations. In many instances, log washers can be multiple stories tall. As such, the support structure needed to absorb the reverberations has to be very substantial to prevent the log washing structure from toppling over. This greatly increases the cost of log washers and, in particular, large log washers used in large scale gravel quarrying facilities.

Log washers have been developed in the past that address the vibration issue by arranging the paddles helically along the length of the shaft. This results in substantially reduced vibration but reduces the disruptive force being exerted on the slurry material as only a single pair of paddles is creating a proximate interface in the slurry at one time. As such, log washers with helically arranged paddles are less effective at dislodging debris from gravel than the traditional log washers having parallel rows of paddles.

Several systems have been proposed which reduce the amount of reverberations felt by the log washer tank. For example, U.S. Pat. No. 6,752,274 B2, to Mirras, entitled, "Log Washer with Staggered Paddles," discloses a log washer where the paddles are positioned in groups and the groups are staggered along the shaft to reduce the shifting load stress and strain in the log washer support structure. By staggering the paddles in such a fashion, only a portion of the load in the tank, as opposed to the entire load in the tank, is thrown against a section of the sidewalls of the tank at any one time upon the rotation of the shafts. By reducing the total load thrown against the sidewalls of the tank on each shaft's rotation, it reduces the intermittent shock loading imposed on the shafts and log washer's support structure. Distributing the stresses generated by the shifting load over the length of the tank and over time further reduces the mechanical vibrations felt by the shafts and tank support structure.

A further problem with conventional log washers is the relatively low throughput of the gravel or sand. While the log washer disclosed in the Mirras patent reduces the amount of vibration over log washers having parallel rows of paddles, Mirras does not provide an increase in the throughput of the material nor does Mirras increase the turbulence of the water flow to dislodge the gravel.

From the foregoing it should be appreciated that there is a need for a log washer that is less susceptible to vibration but also has an increased throughput of material. To this end, there is a need for a log washer that reduces vibration but have paddles that cooperate with each other to enhance the flow of material along the length of the trough.

SUMMARY OF THE INVENTION

In one aspect, the aforementioned needs are satisfied by an apparatus for processing aggregate material into gravel, the apparatus comprising: an elongate enclosure having a first and a second end; a water source that provides water into the elongate enclosure; a aggregate material supply assembly that provides aggregate material to be processed into the elongate enclosure at a first end and wherein the elongate enclosure defines an exit adjacent the second end of the enclosure where the gravel that has been processed is removed from the elongate enclosure; a first and a second shaft mounted so as to be rotatable within the elongate enclosure, wherein the first and second shafts include a plurality of paddles mounted thereon wherein the first and second shafts are located so as to define a central zone wherein the paddles engage the aggregate material in the central zone during rotation of the shafts so as to urge the aggregate material from the first end to the second end of the elongate enclosure and so as to dislodge the gravel from the aggregate material and wherein the plurality of paddles are assembled into a plurality of groups of paddles and wherein the plurality of groups of paddles includes aligned groups of paddles wherein the paddles within the group are aligned and offset groups of paddles wherein the paddles within the group are offset from each adjacent paddle within the group and wherein the aligned groups are offset groups are positioned on the shaft so that at least one interface zone is created within the elongate enclosure where the aggregate material and water are subject to increased turbulence.

In another aspect, the aforementioned needs are satisfied by a log washer apparatus comprising: an elongate enclosure having a first and a second end; an aggregate material supply system that supplies aggregate material in a slurry to a first end of the elongate enclosure; wherein the elongate enclosure defines an exit adjacent the second end of the enclosure where the gravel that has been processed is removed form the elongate enclosure; a first and a second shaft mounted so as to be rotatable within the elongate enclosure, wherein the first and second shaft include a plurality of paddles mounted thereon, wherein the first and second shafts are located so as to define a central zone wherein the paddles engage with the aggregate material slurry during rotation of the shafts so as to urge the aggregate material from the first end to the second end of the elongate enclosure and so as to dislodge the gravel from the aggregate material; wherein the plurality of paddles are arranged into groups wherein at least some of the groups include paddles that are aligned with each other and at least some of the groups include groups of paddles wherein the paddles are offset from each other.

These and other objects and advantages of the present invention will become more apparent from the following description taken in conjunction with the accompanying drawings.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
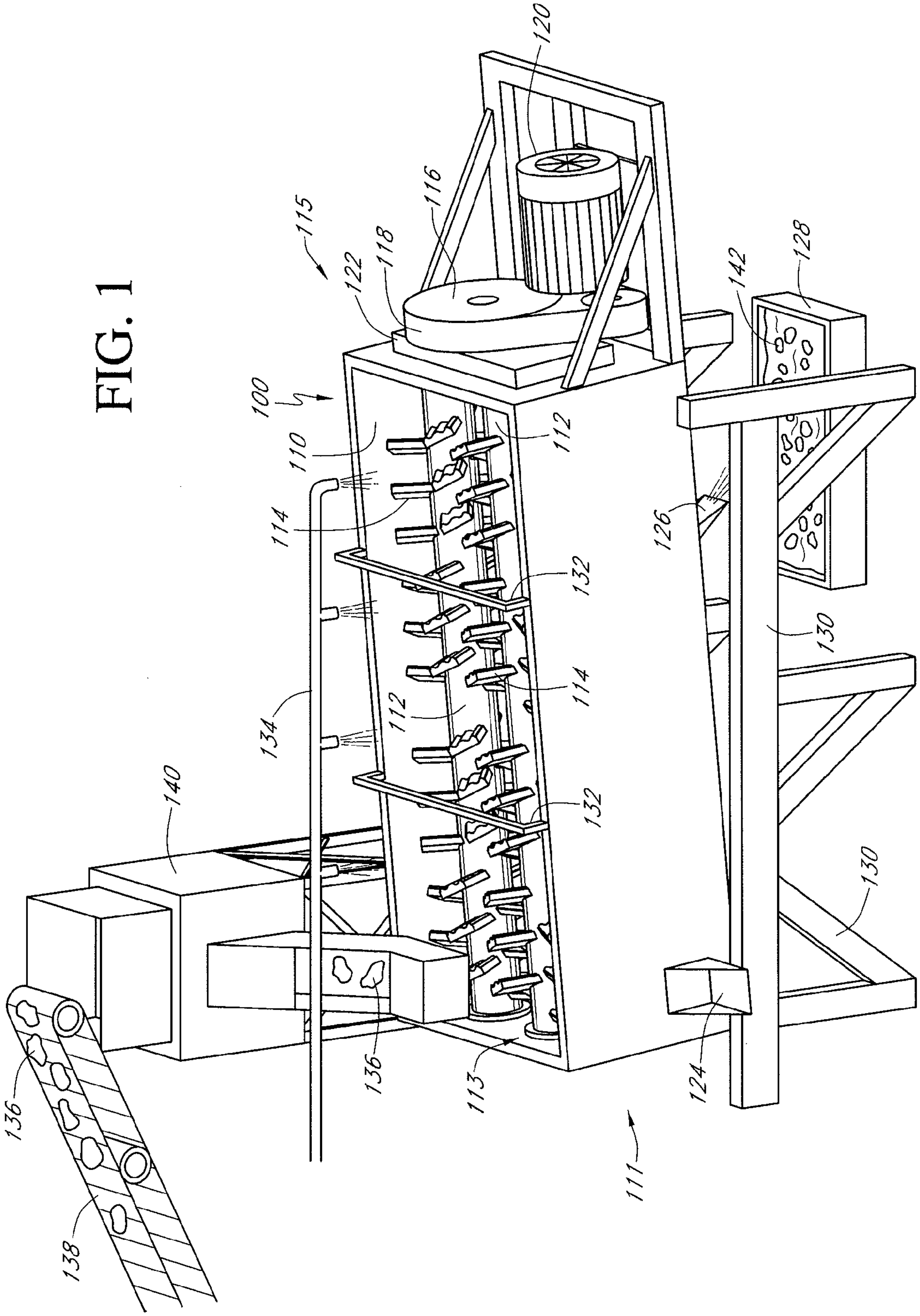
FIG. 1 is a perspective view of a log washer with groups of offset paddles wherein paddles at least within some of the group are offset from each other.

As shown in FIG. 1, the preferred embodiment of the present disclosure is a log washer assembly 100 with groups of offset paddles where paddles within some of the groups are further offset from each other. The log washer assembly 100 has an elongated, open-top enclosure or tank 110 having a two rotating parallel cylindrical shafts 112 located therein. The parallel shafts 112, horizontally mounted from each other, run the along the lengthwise direction of the tank 110. Each shaft 112 has a plurality of paddles 114 mounted thereon, usually mounted to the shaft 112 on an angle, extending radially outward from the shaft 112. The paddles 114 on the opposing shafts 112 are mounted relative to the paddle on the other shaft so that the crude aggregate material 136 is intermeshed between the paddles.

More specifically, the space between the two parallel shafts 112 define an interface area 113 wherein the ends of the paddles 114 are positioned proximate to each other as the shafts 112 rotate. Preferably, the rotation of the shafts 112 is coordinated such that when groups of paddles 114 are extending radially outward at a 90 degree angle into the interface area 113, the paddles 114 on the adjacent shaft 112 are also extending radially outward at a 90 degree angle into the interface area 113 so that the paddles 114 are almost touching. This meshing of the paddles 114 in the interface area 113 exerts a substantial amount of force on the slurry resulting in the gravel being dislodged or otherwise separated from the associated debris material as will be described in greater detail hereinbelow. One or more motors 120 is generally mounted on the one end of the tank 110, the motor 120 driving a gearbox 122, pulley 116 and belt system 118, driving the shafts 112 to rotate continuously. The shafts 112 are coupled to each other by the use of a gear train and the appropriate gearing ratio so that shafts 112 rotate in opposing directions from each other. The shafts 112 at the low end of the tank 110 are generally bolted to a fully machined stub shaft (not shown), while the shafts 112 near the engine are mounted through a flexible coupling to the output shaft of the gearbox 122.

The tank 110 is typically mounted in an incline relative to the horizontal at an angle of between five to ten degrees, with eight degrees being typical. The angle of the tank 110 relative to the horizontal is critical to the output capacity of the machine as measured in tonnage per hour. As the angle of inclination increases, output capacity of the unit decreases, with a corresponding increase in retention time. Decreasing the angle has the opposite effect: increased capacity and a decrease in retention time. The inclination angle is thus typically selected to balance between throughout and retention where greater retention time may be necessary to adequately separate the gravel from the aggregate.

Crude aggregate material 136 is generally placed on a conveyer belt system 138 which moves the material into the top of a hopper 140 which acts as a temporary storage system. The hopper 140 then drops a designated amount of the crude aggregate material 136 between the shafts 112 at the lower end 111 of the tank 110. Pressurized water is then injected from a water source 131 between the log shafts 112 through a manifold 133 mounted at the bottom or lower end 111 of the tank 110. The water separates small roots, dirt, and other extraneous matter that is then carried to the higher end 115 of the tank 110 and forced out with the overflow. Additional water may be added through spray bars 134 mounted along the top of the tub.

The paddles 114, which are arcuate or corrugated shaped in design, scoop the wetted aggregated material 136 from the lower end 111 of the tank 110 to the upper end 115 of the tank 110. The intermeshing nature of the paddles 114 of the adjacent shafts 112 force the aggregate material 136 to a continuous abrading and grinding action which separates the wanted gravel, sand, or the like from the less desired material such as sticks, tree roots, and clay. Soluble waste material generally exits the lower end of the tank through a weir, or discharge chute 124, or similar means. The cleaned aggregate material is expelled at the bottom of the higher end 113 of the tank 110 through a discharge chute 126 to a collection bin 128 for further processing.

Log washer tanks 110 may vary in length from about eighteen feet to about thirty-five feet or even bigger, in width from about three to nine feet, and in depth of about between two and one-half feet to five feet. The log washer 100 may accommodate a flow of water between twenty-five gallons a minute to seven hundred and fifty gallons of water per minute depending on the dimensions of the trough and the material inside. Light material load such as sticks and roots may require more water so that they float away while heavier clays may require less water so more of a slurry is formed for better scrubbing action. The capacity generally varies 50 to 190 tonnages per hour. The machine operated weight of the log washer may vary from 8,000 pounds when unloaded to about 170,000 pounds when fully loaded.

The shafts 112 extend the length of the tank 110 and may vary from eighteen feet to about thirty-five feet or even bigger, have a diameter of between six to forty-six inches. Each shaft 112 will typically have four rows of paddles 114 mounted radially onto the shaft 112 and between twenty-five to thirty paddles 114 mounted on a single row. Each shaft 112 rotates between twenty-five to fifty revolutions per minute. Size of the crude aggregate material 136 may range from tiny particles to agglomerates as large as four inches in length.

The shafts 112 must be designed to be highly resistant to corrosion, twisting, bending, misalignment, and other damages which may incur. The shafts 112 are typically heavy-duty, single-piece, hollow steel pipes which are flanged at both ends to provide easy maintenance. The shafts 112 in a log washer 100 are subjected to high torsional stress which require additional maintenance, replacement costs, and time.

The support structure 130 for the log washer elevates and inclines the tank 110 to a proper level while supporting the tank 110 from the constant agitation caused by the rotating shafts 112 and paddles 114. As each of the shafts 112 rotates, the load inside the tank gets violently tossed against the sidewalls and bottom of the tank 110 along the entire length of the shafts 112. This violent tossing of the load causes enormous vibrations which reverberate along the length of the tank 110 causing the tank 110 to shift violently. As a result, generally the sides of the tank 110 are gusseted and braced in a known manner, and the top of the tank has horizontal braces 132 to further strengthen the design and provide durability throughout the life of the log washer 100.

Figure 2:
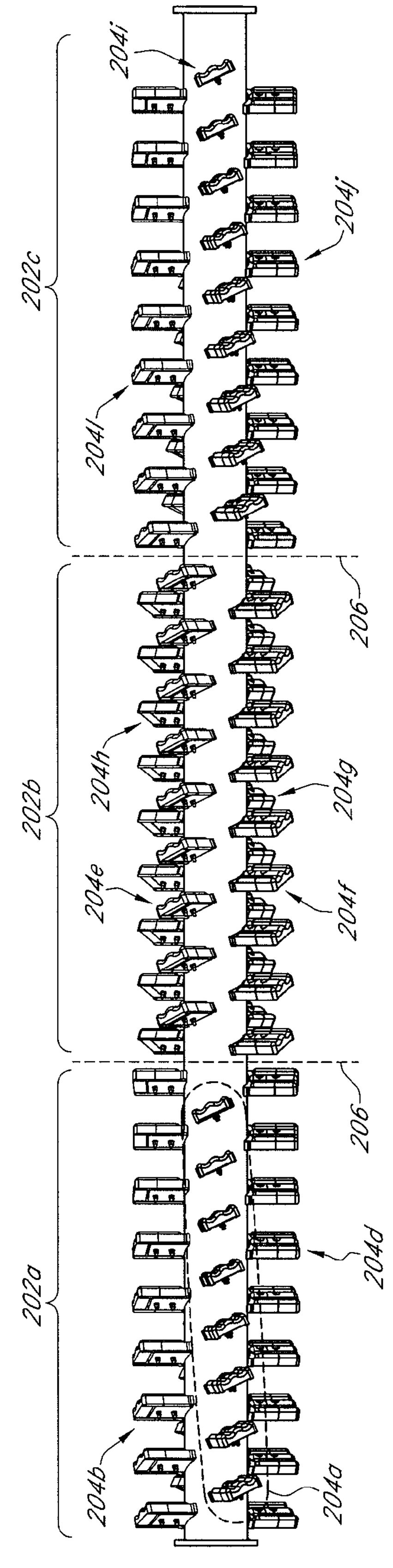
FIG. 2 is a plan view of a log washer shaft of the log washer of FIG. 1.

Referring to FIG. 2, one of the log washer shafts 112 is illustrated in greater detail. While on only a single log washer shaft 112 is described herein, it will be appreciated that both the log washer shafts 112 shown in FIG. 1 have the same configuration as described hereinbelow.

Specifically, as shown in FIG. 2, the shaft 112 has a plurality of paddles 114 which are grouped into three sections, 202*a-c* along the longitudinal length of the shaft 112. In the first section 202*a*, there are four groups 204*a-d* of paddles 114 (three shown) that are spaced around the circumference of the shaft 110 at approximately 90 degree intervals. The groups of paddles 204*a-d* in this embodiment respectively comprise approximately nine paddles 114 although the number of paddles 114 in each group can, of course, vary depending upon the length of the shaft 112 and the size of the log washer 100 without departing from the spirit of the present invention.

As is shown in FIG. 2, in the first section 202*a*, the paddles 114 in each of the groups 204*a-d* are attached to the shaft 112 so as to be offset from each of the other paddles 114 in the group 204*a-d* by a pre-selected angle so that the paddles 114 are not aligned. The shaft 110 is generally cylindrical and the paddles 114 extend radially outward from the outer cylindrical surface of the shaft 110.

Figure 5:
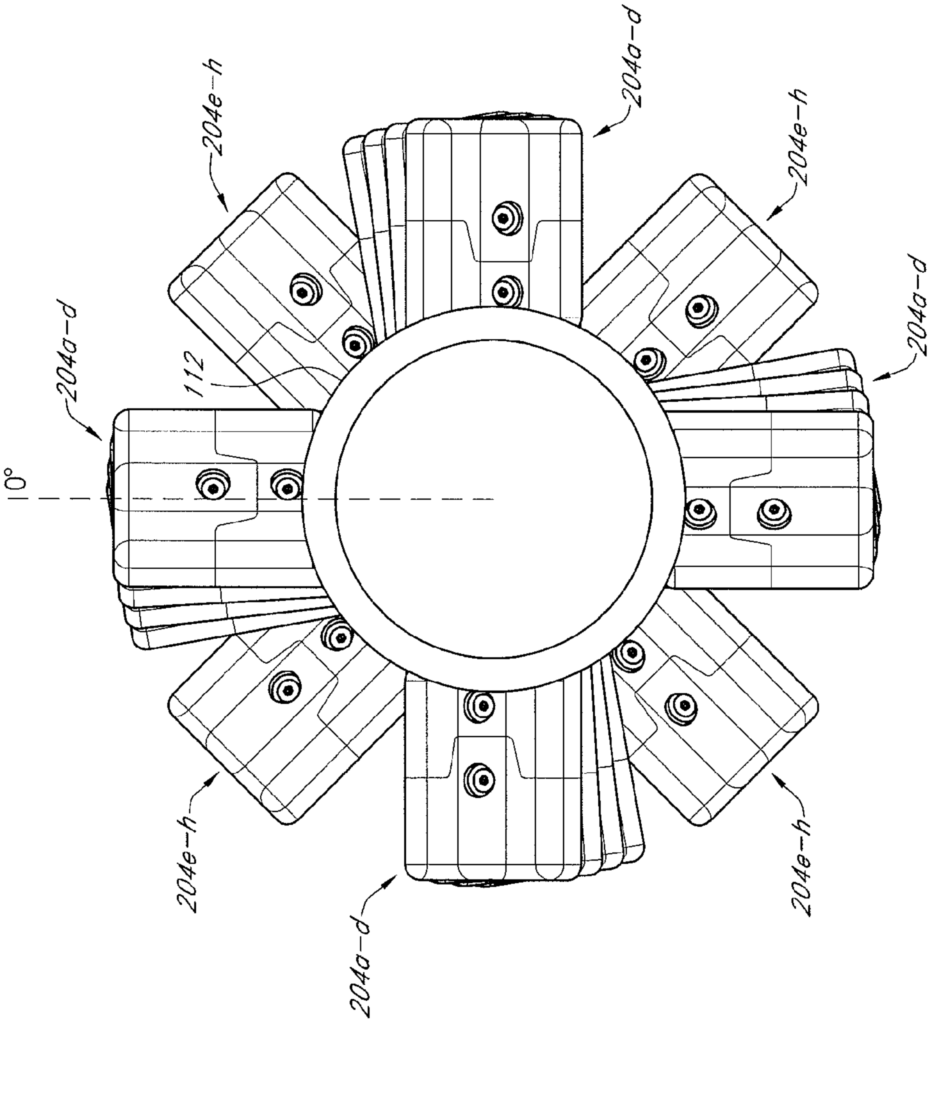
FIG. 5 is an end view of the shaft of FIG. 2, illustrating the relative positioning of groups of paddles.

In this implementation, the offset between adjacent paddles 114 is an angular offset about the circumference of the shaft 110. More specifically, as shown in FIGS. 2 and 5, each successive paddle 114 in each of the groups 204*a-d* are circumferentially offset from it's adjacent paddles 114 in the group 204*a-d* by an angle $\acute{\alpha}$. The angle $\acute{\alpha}$ can vary depending upon the size and application of the log washer 100 but in one specific embodiment is approximately 3 degrees. Each of the paddles 114 are longitudinally offset from each other along the axis of the shaft 110 by a distance that is selected based upon the size and application of the log washer. The angular offset of the paddles 114 in each group 204*a-d* results in greater velocity being imparted on the aggregate that is being washed in the manner that will be described in greater detail below.

As is also shown in FIG. 2, the second section 202*b* of the log washer shaft 112 also has four groups 204*e-h* of paddles 114. The paddles 114 are essentially the same in dimension and configuration as the paddles 114 in the groups 204*a-d* but, it will be appreciated, that the configuration, number and dimension of the paddles 114 in the groups 204*e-h* can vary without departing from the spirit of the present invention. In contrast to the first section 202*a*, however, the groups 204*e-h* of paddles 114 in the second section 202*b* of the log washer shaft 112 are more angularly aligned. As shown in FIGS. 2 and 5, each of the paddles 114 in each of the respective groups 202*e-h* extend radially outward from the outer circumference of the shaft 112 at approximately the same angle such that the paddles are aligned along the longitudinal axis of the shaft 112. As is also illustrated, the groups 202*e-h* are angularly offset from each other by approximately 90 degrees.

As is further shown in FIGS. 2 and 5, the third section 202*c* of the log washer shaft 112 also has four groups 204*i-l* of paddles 114. The paddles in the third section 202*c* are similar to the paddles of the first and section sections 202*a* and *b*. More specifically, however, paddles 114 in each of the groups 204*i-l* are angularly offset from each adjacent paddle 114 in each group by a pre-selected amount. More specifically, in this implementation, each paddle 114 in each group 204*i-l* are angularly offset from each other by the angle $\acute{\alpha}$ in the same manner as described above in connection with the groups 204*a-d* of paddles 114 in the first section 202*a* of the shaft 112.

Thus, each of the shafts 112 have paddles 114 that are arranged in groups 204 where the adjacent paddles in the groups 204*a-d* and 204*i-l* adjacent the ends of the shaft 112 are angularly offset from each other and the adjacent paddles in the groups 204*e-h* are aligned with the other in the center of the shaft 112. This orientation of angularly offset paddles at the ends of the shaft 112 and aligned paddles 114 in the center of the shaft result in improved processing of material.

Figure 3:
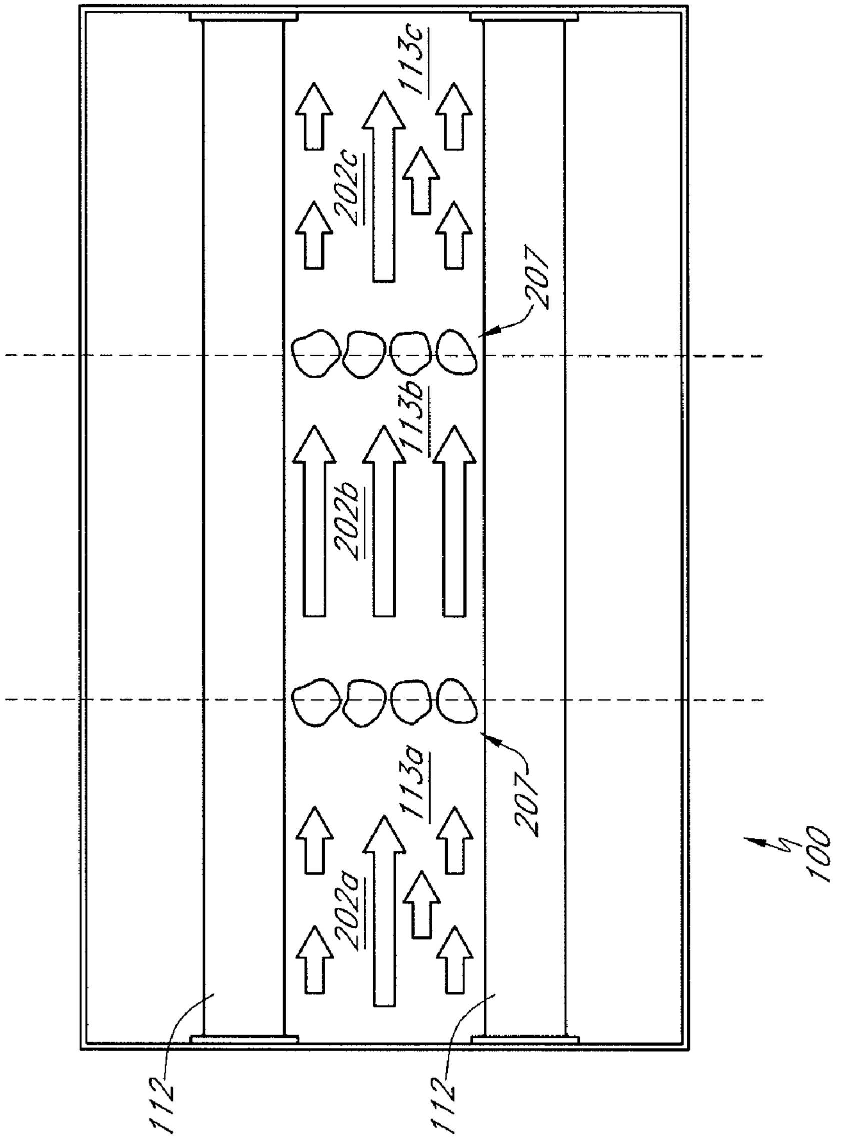
FIG. 3 is a schematic top view of the log washer of FIG. 1 illustrating the flow of aggregate material therethrough.

Referring to FIG. 3, in operation, the different paddle configurations in sections 202*a*, 202*b*, and 202*c* on both of the shafts 112 result in three different zones where the flow of the material 136 is different. These different zones result in both quicker and more effective processing of the aggregate material. Specifically, the zones with the angularly offset paddles, corresponding to sections 202*a* and 202*c*, the material 136 that is positioned in the tank 110 is moved more quickly than in the central zone corresponding to the sections 202*b* on the shafts 112. Angularly offsetting the paddles in the zones 202*a* and 202*c* result in the aggregate material 136 and water to be moved more swiftly than in the central zone 202*b*. This results in flow interfaces 207 (FIGS. 2 and 3) where the water and aggregate material faces more turbulent water flow which results in greater mixing of the aggregate material and improved separation of the gravel from encasing dirt and debris.

Figure 4A:
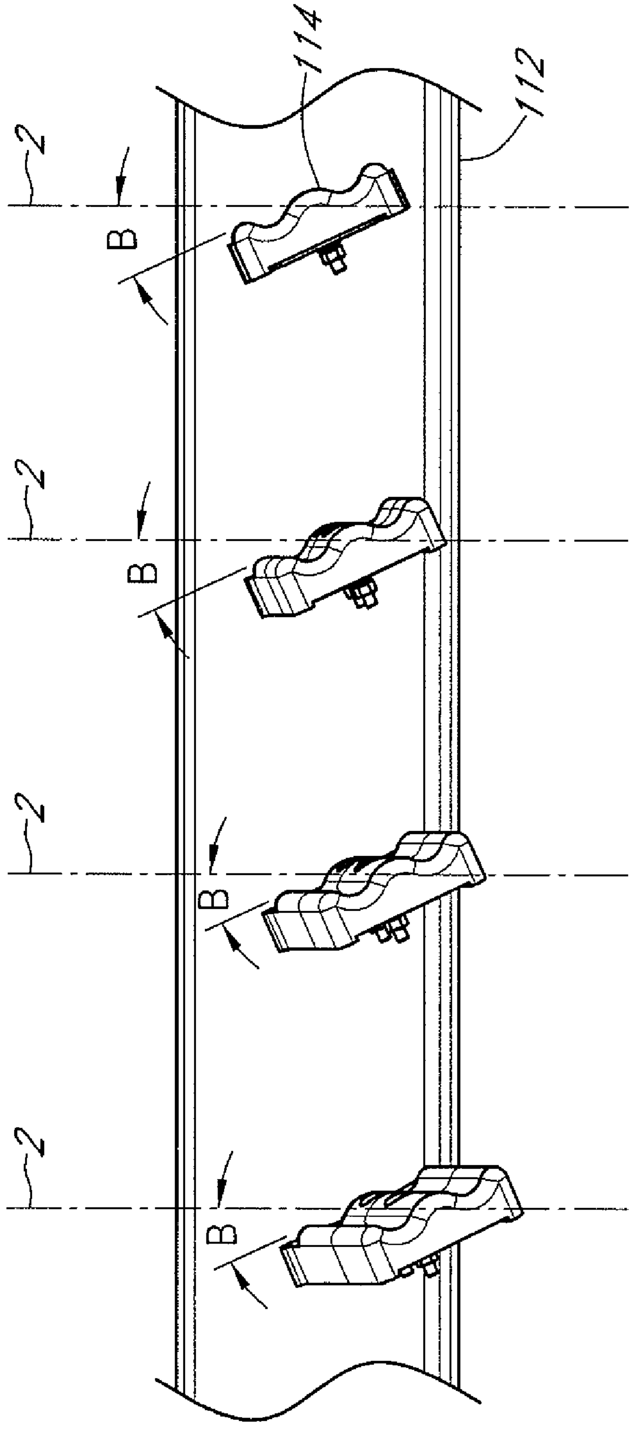
FIGS. 4A and 4B are plan views illustrating a portion of the shafts of FIG. 2.
Figure 4B:
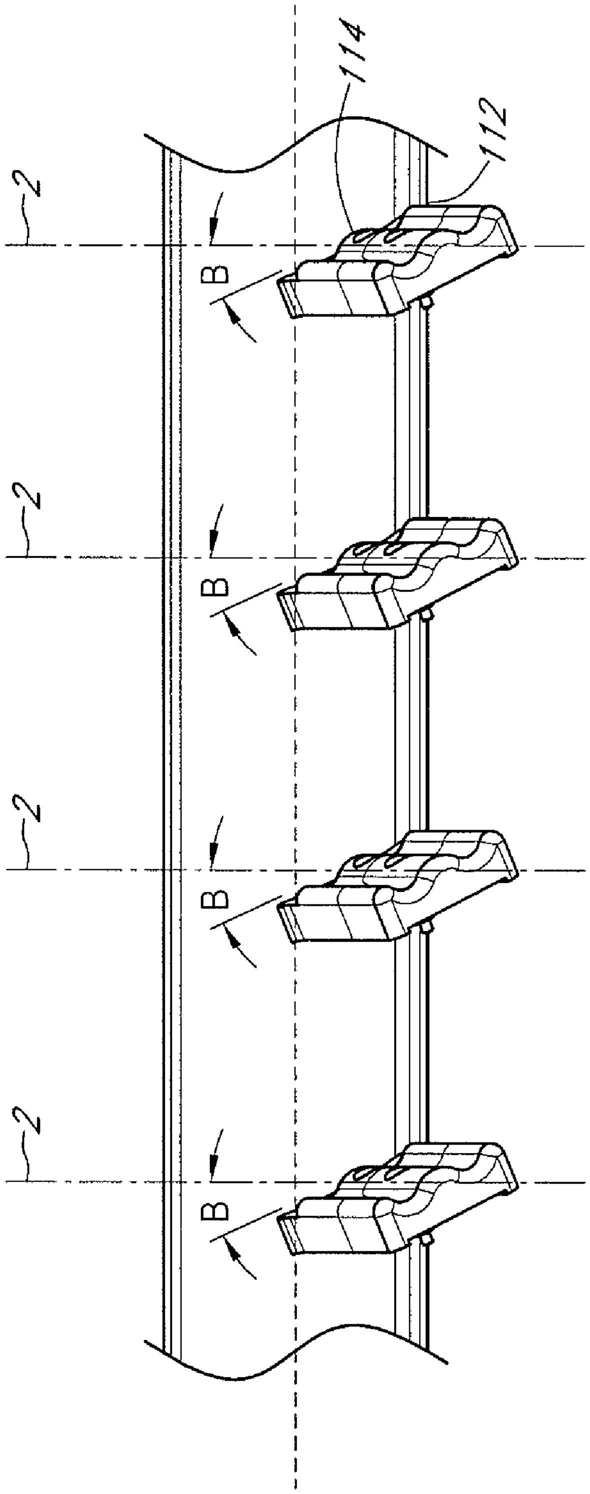

As shown in FIGS. 4A and 4B, the paddles in the first section 200, the second section 202, and the fourth section 206 are offset by an angle β longitudinally from an axis 2. As shown in FIGS. 4A and 4B, the axis 2 is perpendicular to the longitudinal axis of the shaft 112. By offsetting the paddles 114 so that the paddles 114 are offset from perpendicular to the axis of the shaft, rotation of the shaft 112 results in the paddles 114 urging the aggregate material 136 upward along the length of the enclosure 110. The paddles 114 in the angularly offset end sections 202*a* and 202*c*, as well as the paddles 114 in the central aligned section 202*b* have, in this implementation, the same angular offset β. It will be appreciated, however, that different angular offsets between the different sections 202*a-c* of the shaft can be made to vary the relative process flow speed of the aggregate in the zones adjacent the sections without departing from the spirit of the present invention. In one embodiment, β is twenty-five degrees which may vary depending on the aggregate material and the desired throughput of the log washer.

FIG. 5 is an end view of one of the shafts 112 with the paddles 114 protruding therefrom. In this view, the paddles 114 in the section 202*a* of the shaft 112 and the paddles 114 in the section 202*b* are shown. As shown, each of the groups 204*a-d*, 204*e-h* of paddles 114 within a particular section 202*a*, 202*b* are generally circumferentially offset from each other by 90 degrees. Similarly, the group 204*a-d* of paddles 114 in the first section 202*a* are offset from the groups of paddles 204*e-h* by approximately 45 degrees. The groups of paddles 204*i-l* are generally aligned with the groups 204*a-d* of paddles 114 in the first section 202*a* of the shaft 112 and, are thus, not shown in this figure. Offsetting the groups of paddles in this fashion enhances the agitation of the aggregate material 136. It will be appreciated, that any of a number of different rotational orientations can be accomplished without departing from the spirit of the present invention.

In one specific implementation, the shafts 112 are approximately 339 inches long and are approximately 14 inches in diameter. The paddles 114 are generally 11.8 inches wide and extend outward from the outer surface of the shafts approximately 8.3 inches and are 2.7 inches thick. The shafts 112 are positioned 32 inches apart from each other on parallel axes so that the adjacent paddles almost overlap and the shafts 112 rotate at a rate of 32 rpms. The paddles 114 are also spaced approximately 9.0625 inches from each other. This results in a general flow rate of between 50-125 tons per hours of the aggregate material 136 as it is processed in the enclosure 112. As a result of offsetting the groups of paddles 114 wherein the paddles 114 in the groups 204*a-d* and 204*i-l* are further offset from each other and through sectioning the shafts into three main sections, a much greater throughput of gravel, as measured in tonnage per hour, is outputted from the log washer. The paddles 114 on the sections 202*a*, 202*c* create a vacuum effect, drawing the aggregate material 136 between the intermeshing paddles 114. But the intermeshing and individual nature of the paddles 114 creates a repetitive draw, slurry, draw, slurry effect sucking more aggregate material into the tank 110 than would otherwise be possible with a design of a linear arrangement of paddles 114. The vacuum effect helps push the aggregate material 136 up the successive sections of the paddles 114 on the shaft 112. The aligned section 202*b*, however, provides greater force in the interface region 113 due to the larger number of coinciding paddles 114. This creates more turbulence in the interface region 113 adjacent the aligned section 202*b* which results in greater disruptive forces on the aggregate material thereby resulting in greater separation of the gravel from the unwanted materials. Thus, the different sections 202*a-c*, balance both speed and force to obtain an improvement in the throughput of processing aggregate material into gravel. Further, the offsetting of the groups about the circumference of the shafts 112 results in less force being exerted against the enclosure which reduces the overall cost of the log washer as less support structure is needed.

More specifically, the offset paddle 114 and sectioned shaft 112 design also allows the entire load in the tank to be tossed in a staggered motion against the sidewalls and bottom of the tank 110. This staggered tossing of the load ensures that only a portion of the load is thrown against the sidewalls and bottom of the tank 110. The load is thrown against the upper one-third of the length of the tank 110, the middle one third, and the lower one-third of the tank 110 four times per revolution, but staggered in time by one-twelfth of a revolution. The staggered tossing of the load translates into less intermittent shock loading of the tank 110 reducing the reverberations which run along the length of the tank 110, the shafts 112, and the corresponding support structures 130 and 132.

The present disclosure may be embodied in other specific forms without departing from its spirit or essential characteristics. The described embodiment is considered in all respects as illustrative and not restrictive. It will be understood by those skilled in the arts that dividing the rows of paddles 114 on each shaft 112 may be extended to any number of sections which stagger them radially around the shaft 112. It may also be understood that offsetting the paddles from each other can be extended to a plurality of degrees. It may be further understood that dividing the length of the shafts 114 into various sections as described above may be applied to any number of sections. It also may be understood the number of damping zones 208, 210 can be increased depending on the length of the shafts 114 and the desired purpose of the log washer 100. The paddles 114, themselves, may have any desired shape depending on the aggregate material and the purpose of the log washer 100.

Although the foregoing description has shown, described and pointed out novel features of the invention, it will be understood that various omissions, substitutions and changes in the form of the detail of the apparatus as illustrated as well as the uses thereof, may be made by those skilled in the art without departing from the spirit of the present invention. Consequently, the scope of the present invention should not be limited by the foregoing discussion but should be defined by the appended claims.

What is claimed is:

1. An apparatus for processing aggregate material into gravel, the apparatus comprising:

an elongate enclosure having a first and a second end;

a water source that provides water into the elongate enclosure;

a aggregate material supply assembly that provides aggregate material to be processed into the elongate enclosure at a first end and wherein the elongate enclosure defines an exit adjacent the second end of the enclosure where the gravel that has been processed is removed from the elongate enclosure;

a first and a second shaft each having a circumference and an axis wherein the first and second shafts are mounted so as to be rotatable within the elongate enclosure, wherein the first and second shafts include a plurality of paddles mounted thereon wherein the first and second shafts are located so as to define a central zone wherein the paddles engage the aggregate material in the central zone during rotation of the shafts so as to urge the aggregate material from the first end to the second end of the elongate enclosure and so as to dislodge the gravel from the aggregate material and wherein the plurality of paddles are assembled into a plurality of groups of paddles along the axis of the shafts and wherein the plurality of groups of paddles includes aligned groups of paddles wherein the paddles within the group are aligned about the circumference of the shafts and offset groups of paddles wherein the paddles within the group are offset from each adjacent paddle about the circumference of the shafts within the group and wherein the aligned groups are and offset groups are positioned along the axis of on the shaft so that at least one interface zone is created within the elongate enclosure where the aggregate material and water are subject to increased turbulence.

2. The apparatus of claim 1, wherein the paddles are arranged so that there are three sections of paddles with offset groups of paddles being in the first and second sections of paddles along the axis of the shaft and with aligned groups of paddles being in a third section of paddles that is interposed between the first and the second section of paddles along the axis of the shaft.

3. The apparatus of claim 2, wherein the offset groups of paddles in the first and second section comprise four groups of paddles that are spaced approximately 90 degrees from each other about the circumference of the shafts.

4. The apparatus of claim 3, wherein each of the offset groups of paddles comprise 9 paddles.

5. The apparatus of claim 2, wherein each of the paddles in the offset group of paddles is circumferentially offset about the circumference of the shaft a pre-selected number of degrees.

6. The apparatus of claim 5, wherein the paddles in the offset group are offset from their adjacent paddle by approximately 3 degrees about the circumference of the shaft.

7. The apparatus of claim 3, wherein the third section of paddles comprise four aligned groups of paddles that are spaced approximately 90 degrees from each other about the circumference of the shaft.

8. The apparatus of claim 7, wherein the four aligned groups of paddles respectively comprise 9 paddles that extend outward from the shaft at the same circumferential position.

9. The apparatus of claim 8, wherein the aligned groups of paddles are circumferentially offset from the offset groups of paddles by approximately 45 degrees.

10. A log washer apparatus comprising:

an elongate enclosure having a first and a second end;

an aggregate material supply system that supplies aggregate material in a slurry to a first end of the elongate enclosure; wherein the elongate enclosure defines an exit adjacent the second end of the enclosure where the gravel that has been processed is removed form the elongate enclosure;

a first and a second shaft each having an axis and a circumference mounted so as to be rotatable within the elongate enclosure, wherein the first and second shaft include a plurality of paddles mounted thereon, wherein the first and second shafts are located so as to define a central zone wherein the paddles engage with the aggregate material slurry during rotation of the shafts so as to urge the aggregate material from the first end to the second end of the elongate enclosure and so as to dislodge the gravel from the aggregate material;

wherein the plurality of paddles are axially arranged into groups wherein at least some of the groups include paddles that are aligned with each other about the circumference of the shaft and at least some of the groups include groups of paddles wherein the paddles are offset from each other about the circumference of the shaft so that at least one interface zone is created within the elongate enclosure where the aggregate matter and water are exposed to increased turbulence.

11. The apparatus of claim 10, wherein the offset groups of paddles urge the flow of the slurry from the first end to the second end at a first rate and wherein the aligned groups of paddles urge the flow of slurry from the first end to the second end at a second rate and wherein the first rate is greater than the second rate.

12. The apparatus of claim 11, wherein the paddles are arranged so that there are three sections of paddles with offset groups of paddles being in the first and second sections of paddles along the axis of the shaft and with aligned groups of paddles being in a third section of paddles that is interposed between the first and the second section of paddles along the axis of the shaft.

13. The apparatus of claim 12, wherein the offset groups of paddles in the first and second section comprise four groups of paddles that are spaced approximately 90 degrees from each other about the circumference of the shafts.

14. The apparatus of claim 13, wherein each of the offset groups of paddles comprise 9 paddles.

15. The apparatus of claim 12, wherein each of the paddles in the offset group of paddles is circumferentially offset about the circumference of the shaft a pre-selected number of degrees.

16. The apparatus of claim 15, wherein the paddles in the offset group are offset from their adjacent paddle by approximately 3 degrees about the circumference of the shaft.

17. The apparatus of claim 13, wherein the third section of paddles comprise four aligned groups of paddles that are spaced approximately 90 degrees from each other about the circumference of the shaft.

18. The apparatus of claim 17, wherein the four aligned groups of paddles respectively comprise 9 paddles that extend outward from the shaft at the same circumferential position.

19. The apparatus of claim 18, wherein the aligned groups of paddles are circumferentially offset from the offset groups of paddles by approximately 45 degrees.

* * * * *